United States Patent
Choi et al.

(10) Patent No.: US 8,068,088 B2
(45) Date of Patent: Nov. 29, 2011

(54) DISPLAY DEVICE WITH SENSING UNITS AND DRIVING METHOD THEREOF

(75) Inventors: Young-Jun Choi, Suwon-si (KR); Soo-Guy Rho, Suwon-si (KR); Jun-Hee Moon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 986 days.

(21) Appl. No.: 12/016,809

(22) Filed: Jan. 18, 2008

(65) Prior Publication Data
US 2008/0192001 A1 Aug. 14, 2008

(30) Foreign Application Priority Data
Feb. 12, 2007 (KR) .................. 10-2007-0014369

(51) Int. Cl.
*G09G 3/36* (2006.01)
(52) U.S. Cl. .............. 345/104; 345/87; 345/92; 345/98; 345/100
(58) Field of Classification Search ............ 345/87–104, 345/204–215
See application file for complete search history.

(56) References Cited

U.S. PATENT DOCUMENTS

| | | | |
|---|---|---|---|
| 4,177,354 A * | 12/1979 | Mathews ............... | 178/19.05 |
| 4,345,248 A * | 8/1982 | Togashi et al. ........... | 345/90 |
| 5,812,109 A * | 9/1998 | Kaifu et al. ............ | 345/104 |
| 2004/0227743 A1 | 11/2004 | Brown | |
| 2005/0094038 A1 | 5/2005 | Choi et al. | |
| 2006/0017710 A1 | 1/2006 | Lee et al. | |
| 2006/0109222 A1 | 5/2006 | Lee et al. | |
| 2006/0220077 A1 | 10/2006 | Hayashi et al. | |

FOREIGN PATENT DOCUMENTS

| | | |
|---|---|---|
| CN | 1749819 | 3/2006 |
| JP | 11-305932 | 11/1999 |
| JP | 2000-099268 | 4/2000 |
| JP | 2001-042296 | 2/2001 |
| JP | 2004-264845 | 9/2004 |
| JP | 2005-300630 | 10/2005 |
| JP | 2006-154815 | 6/2006 |
| KR | 1020050042917 | 5/2005 |
| KR | 1020060009602 | 2/2006 |
| KR | 1020060056633 | 5/2006 |
| KR | 1020060056793 | 5/2006 |
| KR | 1020060062164 | 6/2006 |
| KR | 100611704 | 8/2006 |

* cited by examiner

*Primary Examiner* — Vijay Shankar
(74) *Attorney, Agent, or Firm* — F. Chau & Associates, LLC

(57) ABSTRACT

A display device includes a display panel having a first panel and a second panel that face each other with a liquid crystal layer therebetween, a plurality of first sense data lines extending in a row direction on the second panel, a plurality of second sense data lines extending in a column direction on the second substrate, and a sense signal processor. A plurality of sensing units are positioned at regions defined by the first and second sense data lines. A first sense data lines is connected to a second sense data line by a contact to output a first sense data signal through the first sense data line and a second sense data signal through the second sense data line. The sense signal processor reads and processes the first and second sense data signals.

21 Claims, 7 Drawing Sheets

DISPLAY DEVICE WITH SENSING UNITS AND DRIVING METHOD THEREOF

CROSS-REFERENCE TO RELATED APPLICATION

This application claims priority to Korean Patent Application No. 10-2007-0014369, filed in the Korean Intellectual Property Office, on Feb. 12, 2007, the disclosure of which is incorporated by reference herein.

BACKGROUND OF THE INVENTION (a) Technical Field

The present disclosure relates to a display device with sensing units and a driving method thereof.

(b) Discussion of the Related Art

The weight and thickness of display devices need to decrease along with the ever decreasing weight and thickness of personal computers and televisions. Accordingly, cathode ray tubes (CRTs) may be replaced with flat panel display devices.

Flat panel display devices may include, for example, a liquid crystal display (LCD), a field emission display (FED) device, an organic light emitting display (OLED), and a plasma display device (PDP).

Each of the active flat panel displays may include a plurality of pixels arranged in a matrix, where the intensity of light is controlled based on luminance information of each of the pixels to display images. LCDs among the active flat panel displays may include a pair of panels that are provided with pixel electrodes and a common electrode, and a liquid crystal layer with dielectric anisotropy interposed between the two panels.

The LCD generates an electric field by applying voltages to the pixel electrodes and the common electrode. The magnitude of the electric field may be varied to adjust the transmittance of light passing through the liquid crystal layer, thereby displaying images.

A touch screen panel may be used to draw characters or pictures on a screen through contact with a finger, a pen, etc. Touch screen panels may also be used to perform a desired command by executing a program when a particular icon is pressed. An LCD with an attached touch screen panel determines whether a contact has occurred and the position of the contact.

However, adding a touch screen to an LCD may increase the cost of a display, decrease the yield due to the addition of a manufacturing process for bonding a touch screen panel on a liquid crystal panel, deteriorate luminance of the liquid crystal panel due to the passage of light through an additional layer, or increase product thickness.

Technology has been developed that provides sensing units within pixels that display an image in an LCD. As a result, an additional touch screen panel is not required. The sensing unit senses a variation of light or pressure applied to a screen of the LCD by a finger, pen, etc. of a user, to determine whether there has been contact with the screen and the position of the contact.

The sensing units include a plurality of row sensing units for sensing row coordinates (Y-axis coordinates) and a plurality of column sensing units for sensing column coordinates (X-axis coordinates). The row sensing units are connected to column signal lines extending in a column direction, and the column sensing units are connected to row signal lines extending in a row direction.

However, since the row and column signal lines extend in different directions, the row and column signal lines are formed in different layers from each other. The response speed of the row and column sensing units at a contact position may be different due to a height difference of the row and column signal lines, thereby decreasing the reliability of the LCD's ability to sense a touch. Thus, there is a need for an LCD which is more reliable at sensing touches.

SUMMARY OF THE INVENTION

According to an exemplary embodiment of the present invention, a display device is provided. The display device includes a display panel, a plurality of first sense data lines, a plurality of second sense data lines, a plurality of sensing units, and a sense signal processor. The display panel has a first panel and a second panel that face each other with a liquid crystal layer disposed between the first and second panels. The plurality of first sense data lines extend in a row direction on the second panel. The plurality of second sense data lines extend in a column direction on the second substrate. The plurality of sensing units are positioned at regions defined by the first and second sense data lines. Connecting one of the first sense data lines to one of the second sense data lines by a contact outputs a first sense data signal through the first sense data line and a second sense data signal through the second sense data line. The sense signal processor reads and processes the first and second sense data signals. The sense signal processor may read and process the first and second sense data signals at different times.

The display panel may further include a common electrode supplied with a common voltage and formed on the first substrate. Each of the sensing units may include a transistor having a control terminal, a first terminal connected to each of the first sense data lines, and a second terminal connected to each of the second sense data lines. The display panel may further include a protrusion facing the control terminal of the transistor, and being disposed between the first substrate and the common electrode.

The sense signal processor may include a plurality of first processing circuits connected to the first sense data lines to generate a first processed signal based on the first sense data signal, a plurality of second processing circuits connected to the second sense data line to generate a second processed signal based on the second sense data signal, and a storing unit to store the first and second processed signals.

Each of the first processing circuits may include a first resistor connected between a first voltage and the first sense data line, a first switching element connected between a second voltage and the first sense data line, a first comparator to compare the first sense data signal from the first sense data line and a reference voltage to generate the first processed signal, a first flip-flop to store the first processed signal, and a second switching element connected between the first comparator and the first flip-flop. The first and second voltages may differ from one another.

In addition, each of the second processing circuits may include a second resistor connected between the first voltage and the second sense data line, a third switching element connected between the second voltage and the second sense data line, a second comparator to compare the second sense data signal from the second sense data line and the reference voltage to generate the second processed signal, a second flip-flop to store the second processed signal, and a fourth switching element connected between the second comparator and the second flip-flop.

The first and fourth switching elements may be simultaneously turned on, and the second and third switching elements may be simultaneously turned on.

The first flip-flop may be in synchronization with a first clock signal and may simultaneously output the first processed signal to the storing unit. The second flip-flop may be in synchronization with a second clock signal and may simultaneously output the second processed signal to the storing unit. The first and second clock signals may differ from one another.

The sensing unit may further include a switching element connected between the first terminal and the control terminal of the transistor which turns off the transistor based on an initializing signal.

The sense signal processor may further include a controller that outputs a control signal to control the first and second processing circuits and the initializing signal.

The display device may further include a contact determiner that receives the first and second processed signals and determines a contact position.

The contact determiner may include a first determiner that receives the first processed signal to determine an X-axis coordinate of a contact, a second determiner that receives the second processed signal to determine a Y-axis coordinate of the contact, and a register that stores the X-axis and Y-axis coordinate of the contact in a flag.

The contact determiner may further include an interface that outputs values stored in the flag. According to an exemplary embodiment of the present invention, a method of driving a display device having a plurality of first sense data lines extending in a row direction, a plurality of second sense data lines extending in a column direction, a plurality of sensing units connected to the first and second sense data lines, and sensing a contact is provided. The method includes connecting at least one of the first sense data lines and at least one of the second sense data lines through at least one of the sensing units when a contact occurs, applying a first voltage to the second sense data lines, reading voltage variations of the first sense data lines as first sense data signals and generating first processed signals based on the first sense data lines, applying the first voltage to the first sense data lines, reading voltage variations of the second sense data lines as second sense data signals and generating second processed signals based on the second sense data lines, and determining contact information based on the first and second processed signals.

The generation of the first and second processed signals may include comparing voltages of the first and second sense data lines and a reference voltage to generate the first and second processed signals.

The method may further include substantially simultaneously writing the first processed signals in a register after generating the first processed signals, and substantially simultaneously writing the second processed signals in the register after generating the second processed signals.

The determination of the contact information may include outputting the first and second processed signals written in the register, determining an X-axis coordinate of the contact based on the first processed signals, determining a Y-axis coordinate of the contact based on the second processed signals, and storing an indication that the contact has occurred and the X-axis and Y-axis coordinate of the contact.

Each of the sensing units may include a transistor having a control terminal, a first terminal connected to each of the first sense data lines, and a second terminal connected to each of the second sense data lines, where the control terminal is connected to a common electrode by a contact.

The display device may include a liquid crystal layer, a lower substrate having the sensing units, and an upper substrate having the common electrode. The upper substrate may include a protrusion facing the control terminal of the transistor and formed under the common electrode.

The driving method may further include turning off the transistor before applying the first voltage to the second sense data lines.

BRIEF DESCRIPTION OF THE DRAWINGS

The present invention will become more apparent by describing exemplary embodiments thereof in detail with reference to the accompanying drawings, in which.

DETAILED DESCRIPTION OF EXEMPLARY EMBODIMENTS

Figure 1:
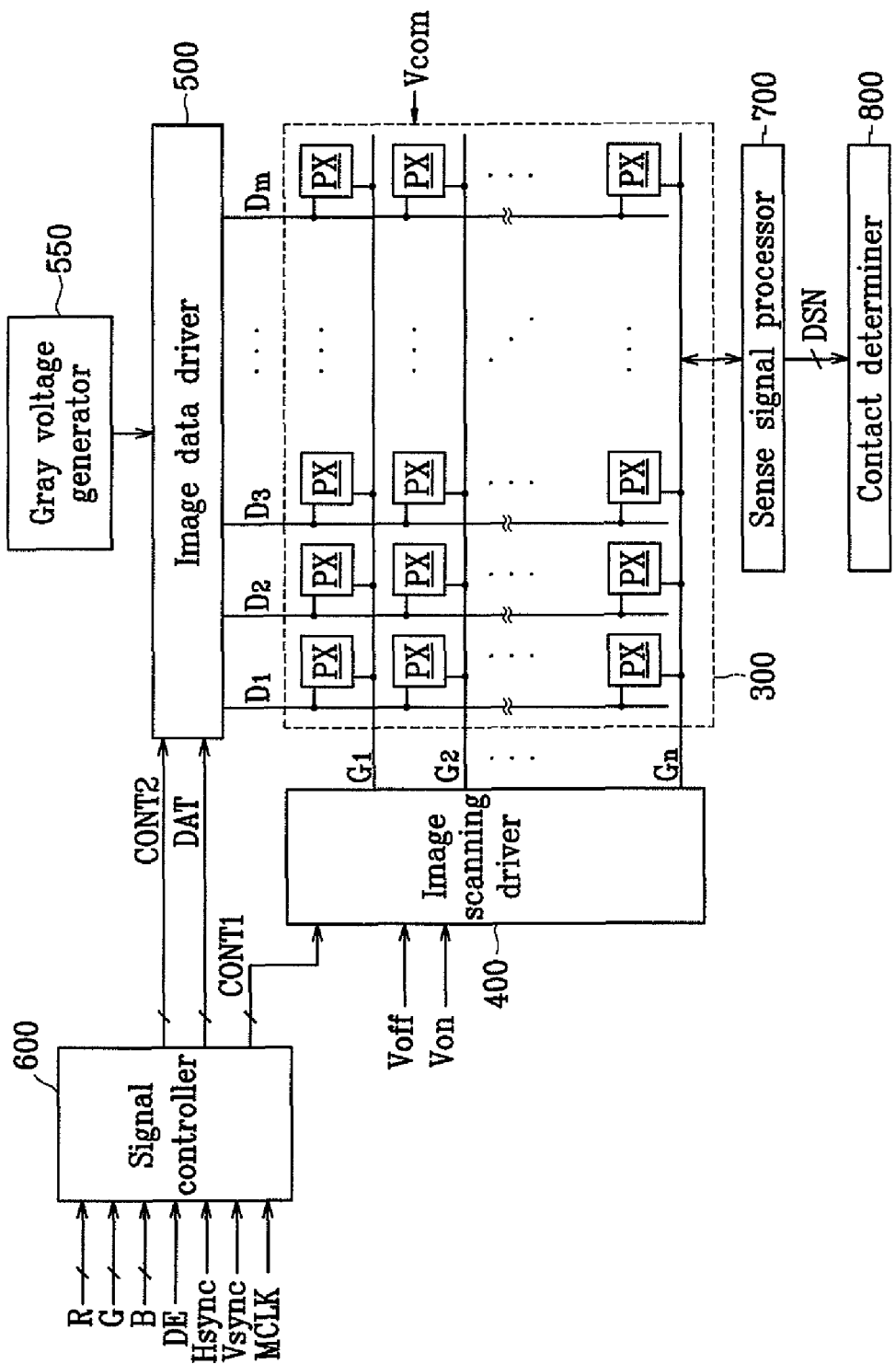
FIG. 1 is a block diagram of an LCD showing pixels according to an exemplary embodiment of the present invention.

Hereinafter, exemplary embodiments of the present invention will be described in detail with reference to the accompanying drawings. The present invention may, however, be embodied in many different forms and should not be construed as limited to the exemplary embodiments set forth herein. In the drawings, the thickness of layers and regions may be exaggerated for clarity. Like numerals may refer to like elements throughout. It will be understood that when an element such as a layer, film, region, substrate, or panel is referred to as being "on" another element, it can be directly on the other element or intervening elements may also be present. An LCD according to exemplary embodiments of the present invention will now be described with reference to FIGS. 1 through 4.

Figure 2:
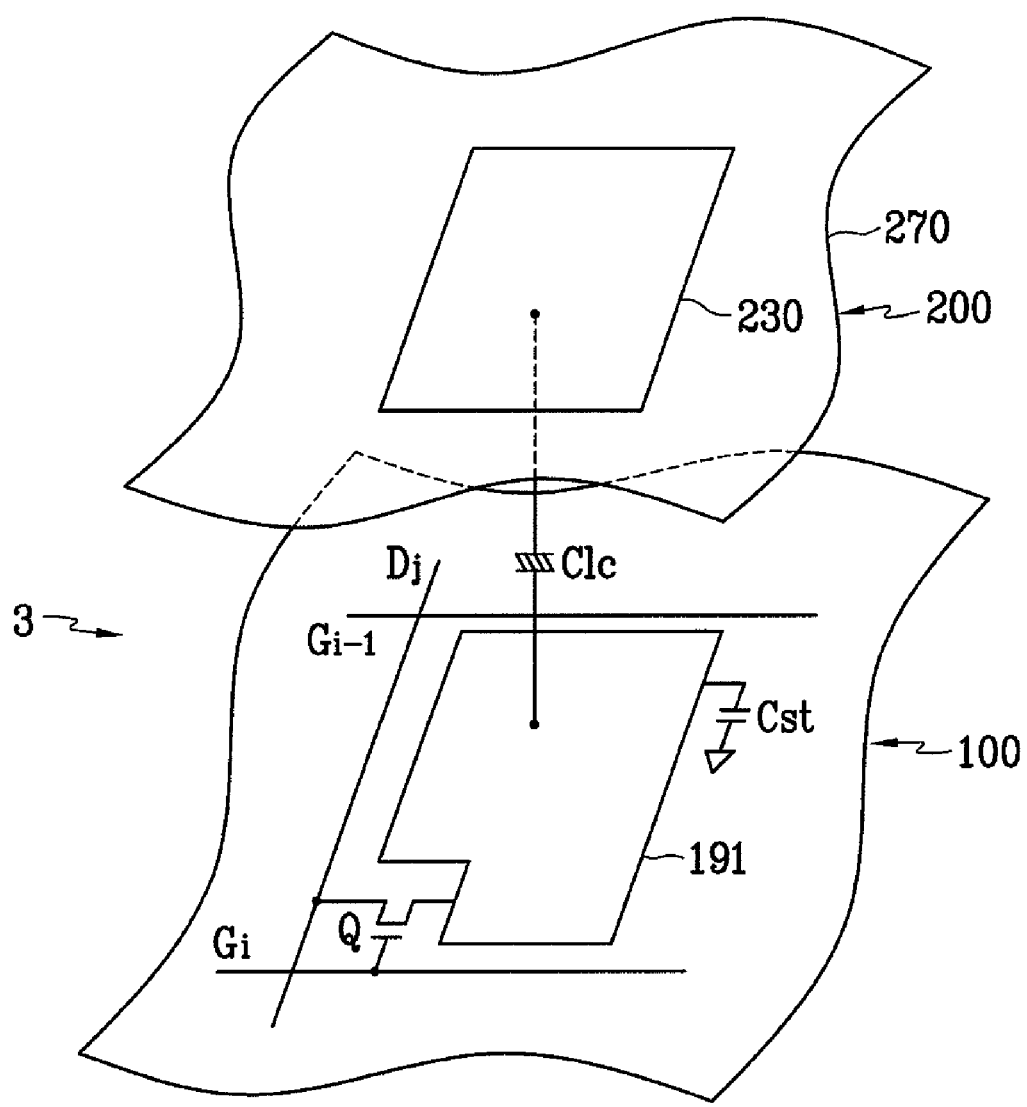
FIG. 2 is an equivalent circuit diagram of a pixel of an LCD according to an exemplary embodiment of the present invention.
Figure 3:
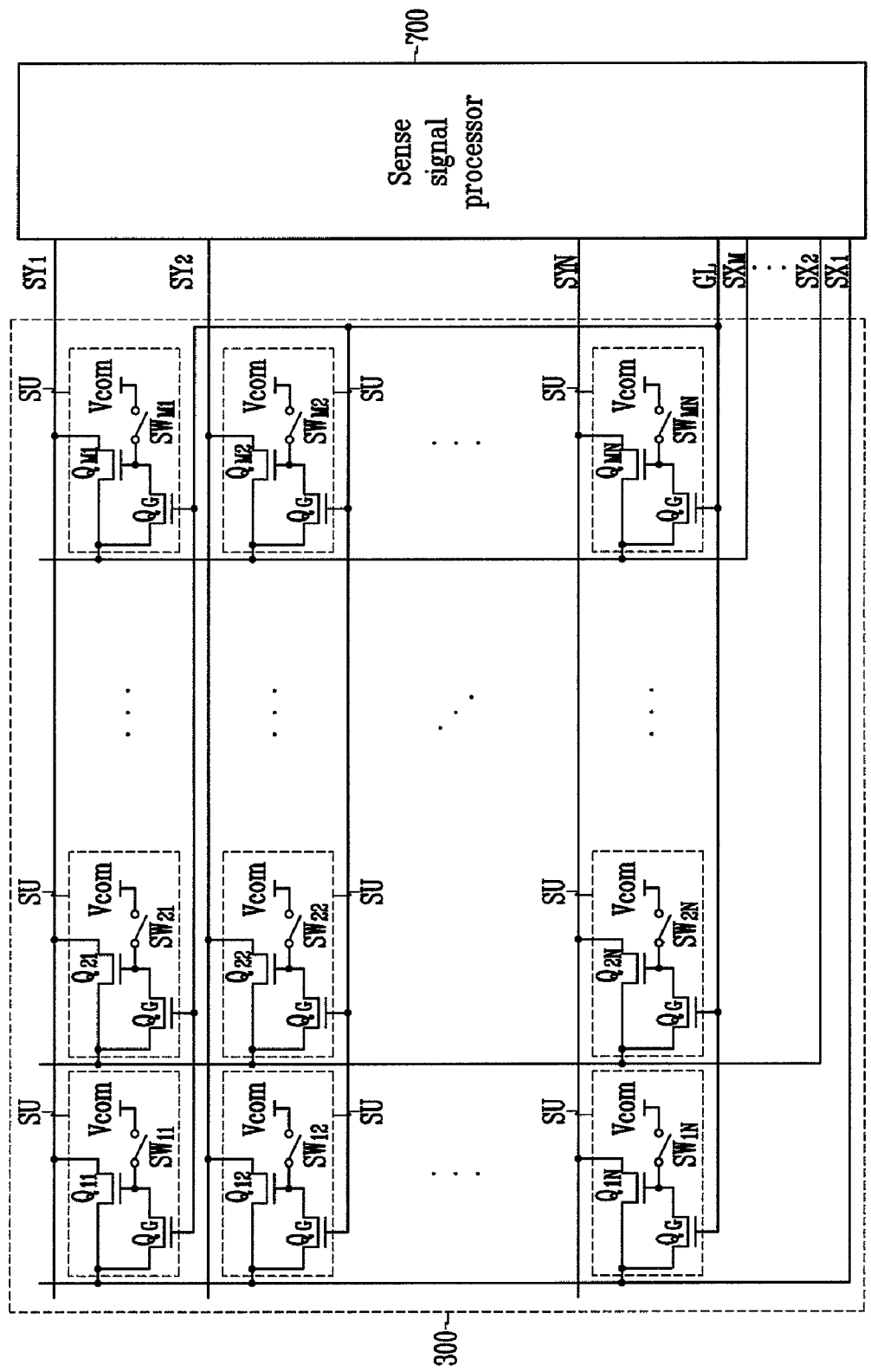
FIG. 3 is a block diagram of an LCD showing sensing units according to an exemplary embodiment of the present invention.

FIG. 1 is a block diagram of an LCD showing pixels according to an exemplary embodiment of the present invention, and FIG. 2 is an equivalent circuit diagram of a pixel of an LCD according to an exemplary embodiment of the present invention. FIG. 3 is a block diagram of an LCD showing sensing units according to an exemplary embodiment of the present invention, and FIG. 4 is an equivalent circuit diagram of a sensing unit of an LCD according to an exemplary embodiment of the present invention.

As shown in FIGS. 1 and 3, an LCD according to an exemplary embodiment of the present invention includes a liquid crystal (LC) panel assembly 300, an image scanning driver 400 coupled with the panel assembly 300, an image data driver 500 coupled with the panel assembly 300, a sense signal processor 700 coupled with the panel assembly 300, a gray voltage generator 550 coupled to the image data driver 500, a contact determiner 800 coupled to the sense signal processor 700, and a signal controller 600 for controlling the above elements.

Referring to FIGS. 1 and 3, the LC panel assembly 300, in an equivalent circuital view, includes a plurality of display signal lines $G_1$-$G_n$ and $D_1$-$D_m$, a plurality of pixels PX, a plurality of sense signal lines $SY_1$-$SY_N$, $SX_1$-$SX_M$, and GL, and a plurality of sensing units SU.

Figure 4:
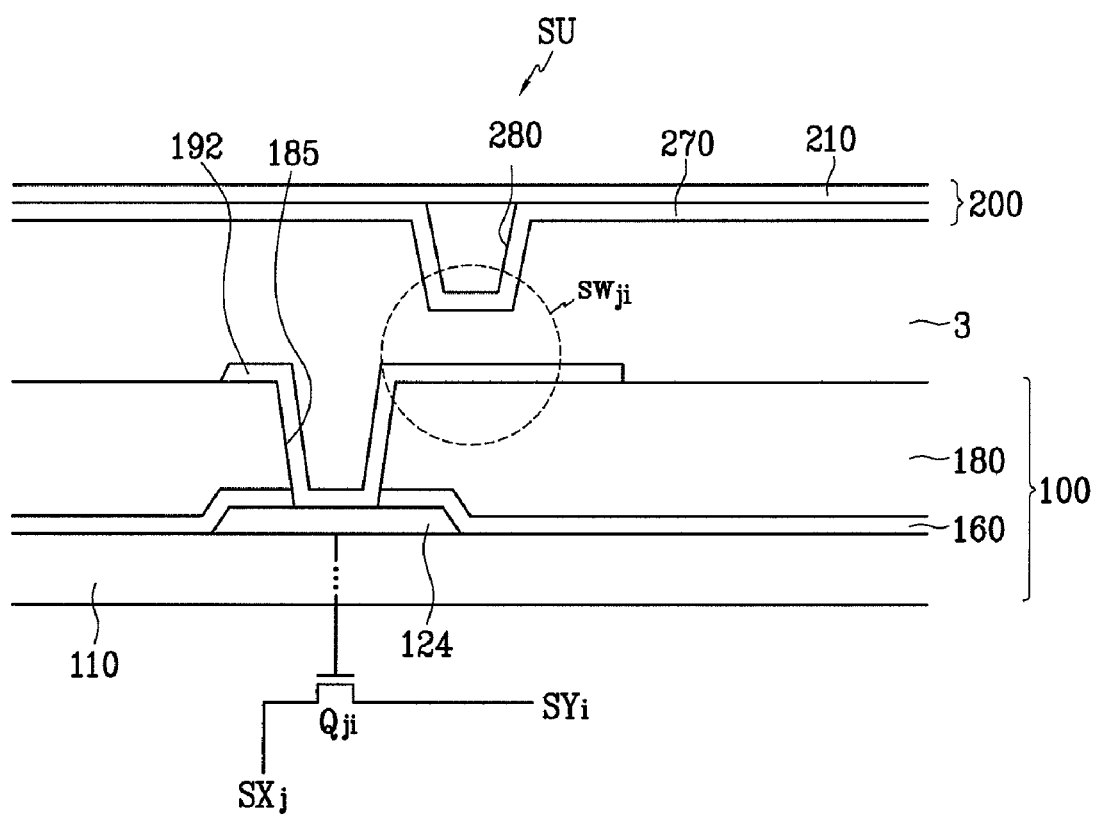
FIG. 4 is an equivalent circuit diagram of a sensing unit of an LCD according to an exemplary embodiment of the present invention.

Referring to FIGS. 2 and 4, the LC panel assembly 300 includes a thin film transistor array (lower) panel 100 and an opposing common electrode (upper) panel 200, an LC layer 3 interposed therebetween, and a spacer (not shown) that maintains a gap between the two panels 100 and 200 and that can be deformed to some extent by compression.

The display signal lines $G_1$-$G_n$ and $D_1$-$D_m$ include a plurality of image scanning lines $G_1$-$G_n$ that transfer an image scanning signal and image data lines $D_1$-$D_m$ that transfer an image data signal. The sense signal lines $SY_1$-$SY_N$, $SX_1$-$SX_M$, and GL include a plurality of column sense data lines $SX_1$-$SX_M$ and a plurality of row sense data lines $SY_1$-$SY_N$ that transfer a sense signal, and a plurality of initializing signal lines GL that transfer an initializing signal.

The image scanning lines $G_1$-$G_n$ and the row sense data lines $SY_1$-$SY_N$ extend in approximately a row direction and are substantially parallel to each other, and the image data lines $D_1$-$D_m$ and the column sense data lines $SX_1$-$SX_M$ extend in approximately a column direction and are substantially parallel to each other.

The initializing signal lines GL extend in approximately a row or column direction, and ends of the initializing signal lines GL are connected to each other.

Referring to FIG. 2, each pixel PX, for example a pixel PX connected to the i-th image scanning line $G_i$ (i=1, 2, . . . , n) and the j-th image data line $D_j$ (j=1, 2, . . . , m), includes a switching element Q connected to the signal lines $G_i$ and $D_j$, and an LC capacitor Clc and a storage capacitor Cst that are connected to the switching element Q. The storage capacitor Cst may be omitted.

The switching element Q, which may be embodied as a TFT, is disposed on the lower panel 100 and has three terminals. A control terminal is connected to the image scanning line $G_i$, an input terminal is connected to the image data line $D_j$, and an output terminal is connected to the LC capacitor Clc and the storage capacitor Cst. The TFT may be made of materials such as, for example, amorphous silicon or polycrystalline silicon.

The LC capacitor Clc includes a pixel electrode 191 disposed on the lower panel 100 and a common electrode 270 disposed on the upper panel 200 as two terminals. The LC layer 3 disposed between the two electrodes 191 and 270 functions as a dielectric of the LC capacitor Clc. The pixel electrode 191 is connected to the switching element Q. The common electrode 270 is supplied with a common voltage Vcom and covers an entire surface of the upper panel 200. Although FIG. 2 illustrates the common electrode 270 being provided on the upper panel 200, the present invention is not limited thereto, as the common electrode 270 may also be provided on the lower panel 100. In addition, at least one of the electrodes 191 and 270 may be shaped as a bar or a stripe.

The storage capacitor Cst is an auxiliary capacitor for the LC capacitor Clc. The storage capacitor Cst may include the pixel electrode 191 and a separate signal line, which is provided on the lower panel 100, overlaps the pixel electrode 191 via an insulator, and is supplied with a predetermined voltage such as the common voltage Vcom. Alternatively, the storage capacitor Cst may include the pixel electrode 191 and an adjacent image scanning line called a previous image scanning line, which overlaps the pixel electrode 191 via an insulator.

For color display, each pixel may uniquely represent one of the primary colors (i.e., spatial division) or each pixel may sequentially represent each of the primary colors in turn (i.e., temporal division) such that a spatial or temporal sum of the primary colors is recognized as a desired color. An example of a set of the primary colors includes red, green, and blue. FIG. 2 shows an example of spatial division where each pixel includes a color filter 230 representing one of the primary colors in an area of the upper panel 200 facing the pixel electrode 191. Alternatively, the color filter 230 may be provided on or under the pixel electrode 191 on the lower panel 100.

Referring to FIG. 3, each of the sensing units SU is disposed in a region defined by one row sense data line $SY_1$-$SY_N$ and one sense data line $SX_1$-$SX_M$. Each sensing unit SU includes a sensing transistor $Q_{11}$-$Q_{MN}$, an initializing transistor $Q_G$, and a switching element $SW_{11}$-$SW_{MN}$.

Each of the sensing transistors $Q_{11}$-$Q_{MN}$ is a TFT having three terminals, i.e., a control terminal, an input terminal connected to one row sense data line $SY_1$-$SY_N$, and an output terminal connected to one column sense data line column $SX_1$-$SX_M$.

The initializing transistors $Q_G$ initialize the sensing transistors $Q_{11}$-$Q_{MN}$, and each of the initializing transistors $Q_G$ includes a control terminal connected to the initializing signal line GL, an input terminal connected to the output terminal of the sensing transistor $Q_{11}$-$Q_{MN}$, and an output terminal connected to the control terminal of the sensing transistor $Q_{11}$-$Q_{MN}$.

Each of the switching elements $SW_{11}$-$SW_{MN}$ is connected between the common voltage Vcom and the control terminal of the sensing transistor $Q_{11}$-$Q_{MN}$, and transmits the common voltage Vcom to the control terminal of the sensing transistor $Q_{11}$-$Q_{MN}$ by a contact.

A switching element $SW_{ji}$ will be described in detail with reference to FIG. 4. The sensing transistor $Q_{ji}$ is a TFT provided on the TFT array panel 100 along with the switching element Q of a pixel PX. The input terminal and the output terminal of the sensing transistor $Q_{ji}$ are formed on a substrate 110 of the TFT array panel 100 and connected to the row and column sense data lines $SY_1$-$SY_N$ and $SX_1$-$SX_M$, respectively. A control terminal 124 of the sensing transistor $Q_{ji}$ is formed on the substrate 110 and insulated from the input terminal and the output terminal. An interlayer insulating layer 160 and a passivation layer 180 are sequentially formed on the control terminal 124.

The control terminal 124 is exposed by a contact hole 185 that is formed on the interlayer insulating layer 160 and the passivation layer 180. The TFT array panel 100 includes a contact member 192 formed on the passivation layer 180, and the contact member 192 is connected to the control terminal 124 through the contact hole 185.

The common electrode panel 200 includes protrusions 280 formed between a substrate 210 and the common electrode 270, and each of the protrusions 280 faces the corresponding contact member 192.

The control terminal 124 of the sensing transistor $Q_{ji}$ connected to the contact member 192 and the common electrode 270 on the protrusion 280 form a switching element $SW_{ji}$, and the switching element $SW_{ji}$ is turned on or off in accordance with a distance variation between the TFT array panel 100 and the common electrode panel 200 by a contact.

When a contact occurs due to pressing the LC panel assembly 300, for example by a finger of a user, a spacer is deformed by the pressure of the finger, and thereby portions near a contact point of the common electrode panel 200 become closer to the TFT array panel 100 such that a distance between the two panels 100 and 200 decreases.

The distance between the common electrode 270 on the protrusion 280 and the contact member 192 of the TFT array panel 100 may decrease until the contact member 192 and the common electrode 270 contact each other.

When the common voltage Vcom is supplied to the control terminal 124 of the sensing transistor $Q_{ji}$, the sensing transistor $Q_{ji}$ is turned on to connect a row sense data line $SY_i$ and a column sense data line $SX_j$ that are connected to the sensing transistor $Q_{ji}$.

An operation state of the sensing transistor $Q_{ji}$ is changed based on where a contact occurs, and a state of sense data signals from the sense data lines $SY_1$-$SY_N$ and $SX_1$-$SX_M$ is varied in accordance with the operation state of the sensing transistor $Q_{ji}$.

A sensing unit SU is disposed at every intersecting area of the row and column sense data lines $SY_1$-$SY_N$ and $SX_1$-$SX_M$, and the sensing units SU are operated as a one-point type, of which X-axis and Y-axis coordinates of one contact are sensed by one sensing unit SU.

The sensing unit SU may be disposed between two adjacent pixels PX. The density of one sensing unit SU, which is connected to the row and column sense data lines $SY_1$-$SY_N$ and $SX_1$-$SX_M$ may be, for example, about ¼ of a dot density One dot includes, for example, three pixels PX that are arranged parallel to each other and that display three primary colors of red, green, and blue. The unit pixels of one dot may work in conjunction to display multiple colors. A dot may also be defined as the smallest resolution unit of the LCD. In an alternative exemplary embodiment, one dot may include at least four unit pixels PX and each of the pixels PX may display one of three primary colors and white.

An example of the density of one sensing unit SU being ¼ of the dot density is when the row and column resolution of one sensing unit SU is ½ of the row and column resolution of the LCD, respectively. There may be a pixel row and a pixel column where there is no sensing unit SU.

When the density of the sensing units SU and the dot density are set in this way, the LCD may be applied to an application requiring high accuracy, such as character recognition. The resolution of the sensing units SU may be higher or lower, as necessary.

The space occupied by the sensing units SU and the sense data lines $SY_1$-$SY_N$ and $SX_1$-$SX_M$ may be less than the pixels PX, thereby minimizing an aperture decrement.

Referring to FIGS. 1 and 3 again, the gray voltage generator 550 generates a full number of gray voltages or a limited number of gray voltages (referred to as "reference gray voltages" hereinafter) related to the transmittance of the pixels PX. Some of the (reference) gray voltages have a positive polarity relative to the common voltage Vcom, while the other (reference) gray voltages have a negative polarity relative to the common voltage Vcom.

The image scanning driver 400 is connected to the image scanning lines $G_1$-$G_n$ of the panel assembly 300, and synthesizes a gate-on voltage Von and a gate-off voltage Voff to generate the image scanning signals for application to the image scanning lines $G_1$-$G_n$.

The image data driver 500 is connected to the image data lines $D_1$-$D_m$ of the panel assembly 300 and applies image data voltages, which are selected from the gray voltages supplied from the gray voltage generator 550 to the image data lines $D_1$-$D_m$. When the gray voltage generator 550 generates only a few of the reference gray voltages, rather than all the gray voltages, the image data driver 500 may divide the reference gray voltages to generate the image data voltages from among the reference gray voltages.

The sense signal processor 700 is connected to the sense data lines $SY_1$-$SY_N$ and $SX_1$-$SX_M$ of the LC panel assembly 300 and the initializing lines GL to apply an initializing voltage to the initializing lines GL and receive sense data signals that are output through the sense data lines $SY_1$-$SY_N$ and $SX_1$-$SX_M$. The sense signal processor 700 also converts the analog sense data signals from the sense data lines $SY_1$-$SY_N$ and $SX_1$-$SX_M$ to digital sense data signals DSN.

The contact determiner 800 receives digital sensing signals DSN from the sense signal processor 700, performs signal processing to determine whether a contact occurs and a position of the contact, and outputs contact information such as the contact position.

The signal controller 600 controls the image scanning driver 400, the image data driver 500, the gray voltage generator 550, and the sense signal processor 700.

Each of the driving devices 400, 500, 550, 600, 700, and 800 may include at least one integrated circuit (IC) chip mounted on the LC panel assembly 300 or on a flexible printed circuit (FPC) film in a tape carrier package (TCP) type, which are attached to the panel assembly 300. Alternatively, at least one of the driving devices 400, 500, 550, 600, 700, and 800 may be integrated into the panel assembly 300 along with the signal lines $G_1$-$G_n$, $D_1$-$D_m$, $SY_1$-$SY_N$, $SX_1$-$SX_M$, and GL and the switching elements Q. As a further alternative, several of the driving devices 400, 500, 550, 600, 700, and 800 may be integrated into a single IC chip with at least one of the driving devices 400, 500, 550, 600, 700, and 800 or at least one circuit element in at least one of the driving devices 400, 500, 550, 600, 700, and 800 being disposed external to the single IC chip.

The signal controller 600 is supplied with input image signals R, G, and B and input control signals such as, for example a vertical synchronization signal Vsync, a horizontal synchronization signal Hsync, a main clock signal MCLK, and a data enable signal DE, for controlling the display thereof from an external graphics controller (not shown). Based on the input control signals and the input image signals R, G, and B, the signal controller 600 generates gate control signals CONT1 and data control signals CONT2, and processes the image signals R, G, and B to be suitable for the operation of the panel assembly 300 and the image data driver 500.

In response to the data control signals CONT2 from the signal controller 600, the image data driver 500 receives a packet of the digital image signals DAT for a row of pixels PX from the signal controller 600, converts the digital image signals DAT into analog image data voltages selected from the gray voltages, and applies the analog image data voltages to the image data lines $D_1$-$D_m$.

The image scanning driver 400 applies the gate-on voltage Von to an image scanning line $G_1$-$G_n$ in response to the gate control signals CONT1 from the signal controller 600, thereby turning on the switching transistors Q connected thereto. The image data voltages applied to the image data lines $D_1$-$D_m$ are then supplied to the pixels PX through the activated switching transistors Q.

A difference between an image data voltage and the common voltage Vcom applied to a pixel PX is represented as a voltage across the LC capacitor Clc of the pixel PX, which is referred to as a pixel voltage. The LC molecules in the LC capacitor Clc have orientations depending on the magnitude of the pixel voltage, and the molecular orientations determine the polarization of light passing through the LC layer 3.

Polarizers convert light polarization to light transmittance such that the pixel PX has a luminance represented by a gray of the image data voltage.

By repeating this procedure by a unit of a horizontal period (which is also referred to as "1H" and is equal to one period of the horizontal synchronization signal Hsync and the data enable signal DE), all image scanning lines $G_1$-$G_n$ are sequentially supplied with the gate-on voltage Von, thereby applying the image data voltages to all pixels PX to display an image for a frame.

When a next frame starts after a previous frame finishes, the inversion signal RVS applied to the image data driver 500 is controlled such that the polarity of the image data voltages is reversed (which is referred to as "frame inversion"). The inversion signal RVS may also be controlled such that the polarity of the image data voltages flowing in an image data line is periodically reversed during one frame (for example, row inversion and dot inversion), or the polarity of the image data voltages in one packet is reversed (for example, column inversion and dot inversion).

The LCD reads the sense data signals from the sense data lines $SY_1$-$SY_N$ and $SX_1$-$SX_M$ by a predetermined period and determines whether a contact occurs and a position of the contact.

A contact sensing operation of the LCD including the sensing units SU of the one-point type will be described with reference to FIGS. 5 to 7.

Figure 5:
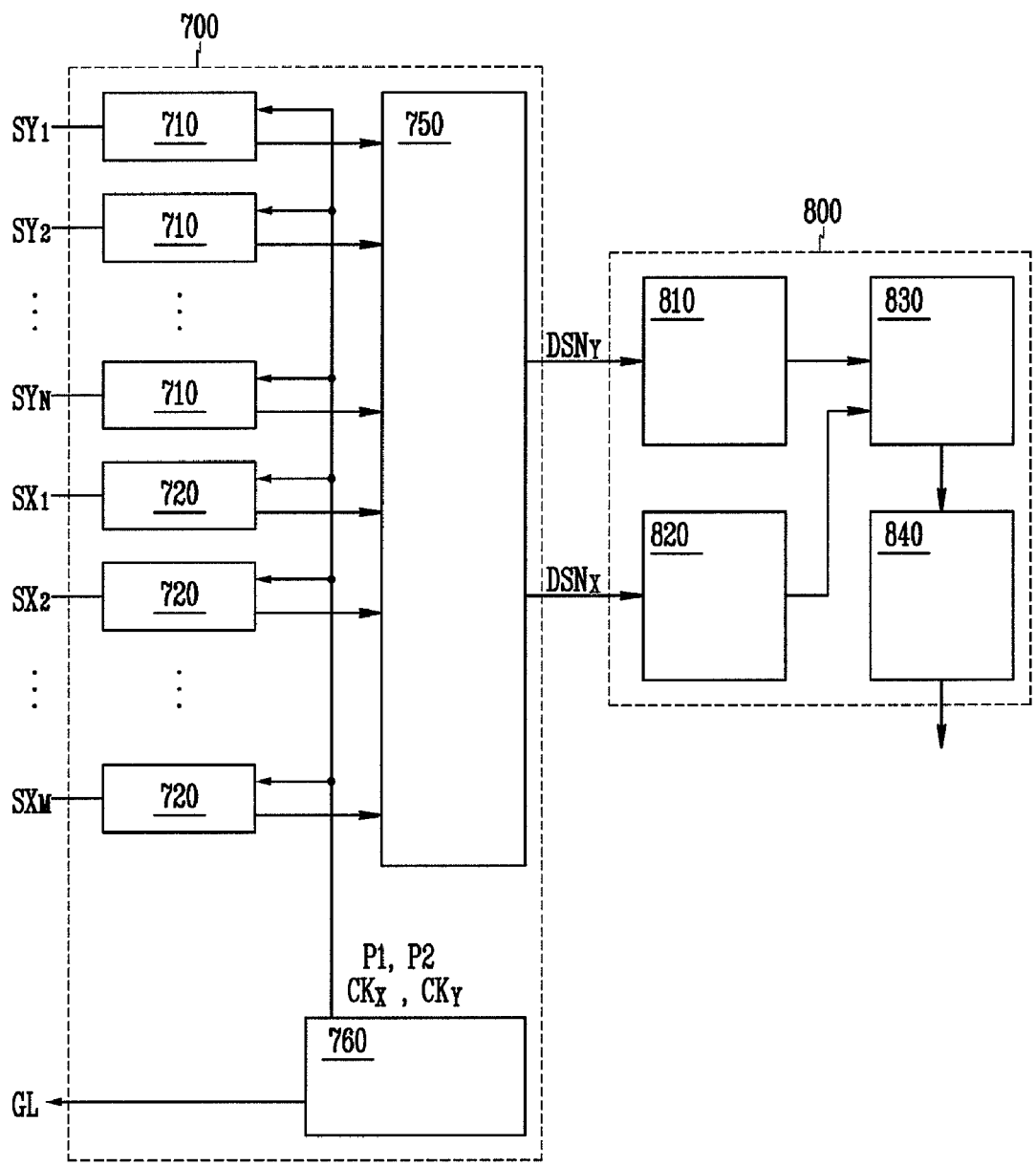
FIG. 5 is a block diagram of a sense signal processor and a contact determiner according to an exemplary embodiment of the present invention.
Figure 6:
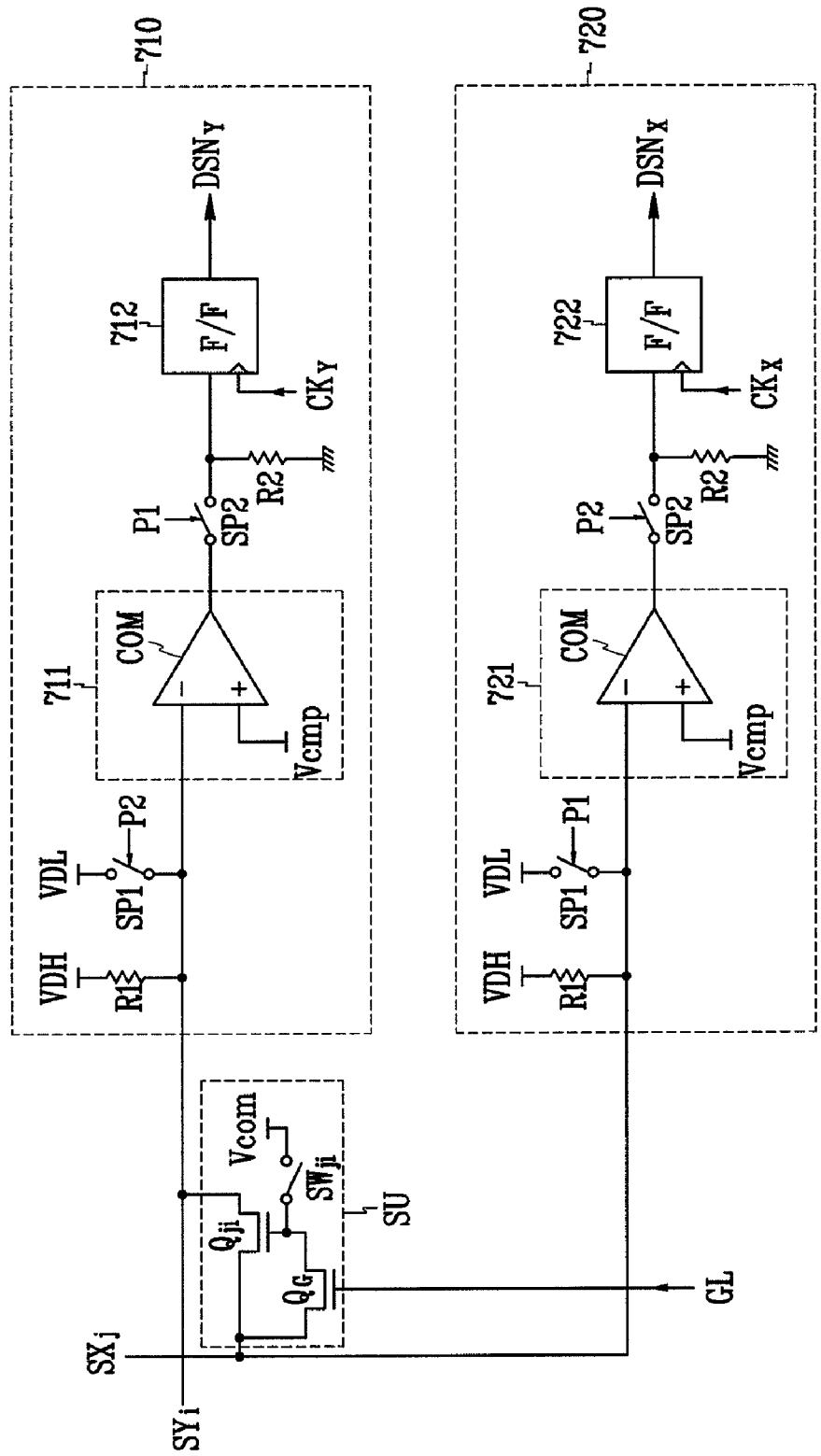
FIG. 6 is an equivalent circuit diagram of first and second processing circuits shown in FIG. 5 according to an exemplary embodiment of the present invention.
Figure 7:
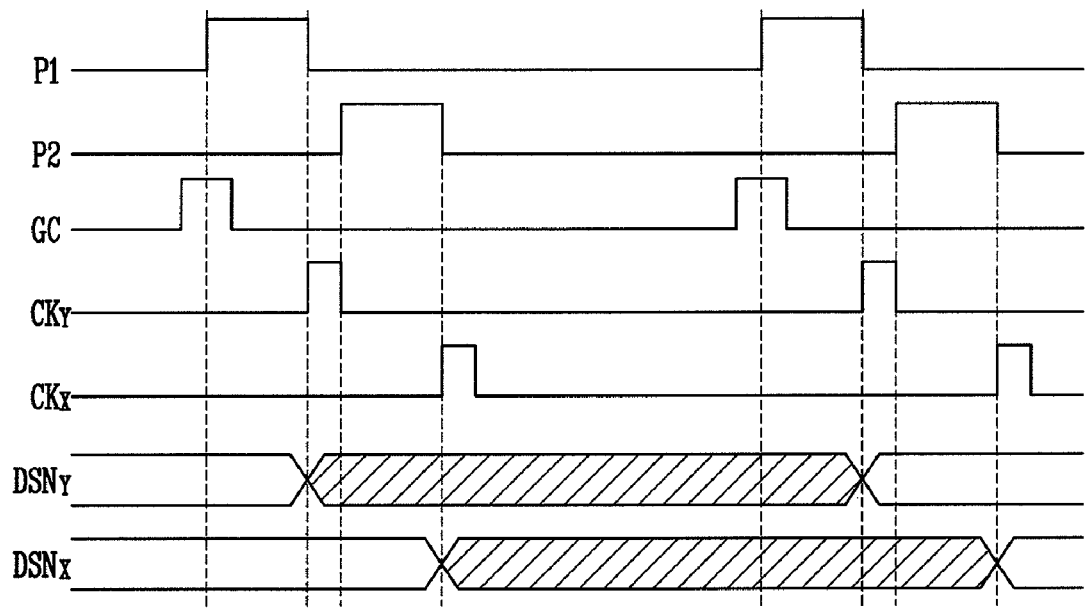
FIG. 7 shows signals that may be used in the first and second processing circuits shown in FIG. 6.

FIG. 5 is a block diagram of a sense signal processor and a contact determiner according to an exemplary embodiment of the present invention, FIG. 6 is an equivalent circuit diagram of first and second processing circuits shown in FIG. 5 according to an exemplary embodiment of the present invention, and FIG. 7 shows signals used in the first and second processing circuits shown in FIG. 6.

Referring FIG. 5, the sense signal processor 700 includes a plurality of first processing circuits 710 that are connected to the row sense data lines $SY_1$-$SY_N$, respectively, a plurality of second processing circuits 720 that are connected to the column sense data lines $SX_1$-$SX_M$, respectively, a register 750, and a controller 760.

The first and second processing circuits 710 and 720 read analog sense data signals from each of the row sense data lines $SY_1$-$SY_N$ and each of the column sense data lines $SX_1$-$SX_M$, convert digital sense data signals DSN that have the contact information with respect to X-axis and Y-axis coordinates, and output them to the register 750.

The first processing circuits 710 and the second processing circuits 720 may operate simultaneously. Operation states of the first processing circuits 710 and the second processing circuits 720 are opposite to each other.

The register 750 may be a memory that has the X-axis coordinates and Y-axis coordinates as addresses. The register 750 sequentially receives the digital sense data signals $DSN_X$ and $DSN_Y$ from the first and second processing circuits 710 and 720 and stores them in the addresses. The digital sense data signals $DSN_X$ are column digital sense data signals from the column sense data lines $SX_1$-$SX_M$, and the digital sense data signals $DSN_Y$ are row digital sense data signals from the row sense data lines $SY_1$-$SY_N$. The column and row digital sense data signals $DSN_X$ and $DSN_Y$ form the digital sense data signals DSN.

The controller 760 outputs control signals P1, P2, $CK_X$, and $CK_Y$. The control signals P1, P2, $CK_X$, and $CK_Y$ control input and output operations of the first and second processing circuits 710 and 720. The controller 760 may be disposed in the sense signal processor 700, but alternatively may be disposed external to the sense signal processor 700, for example, in the contact determiner 800.

The contact determiner 800 includes first and second determiners 810 and 820, a register 830, and an interface unit 840. The first determiner 810 receives the digital sense data signals $DSN_Y$ with respect to the Y-axis coordinates from the register 750, and analyzes the row digital sense data signals $DSN_Y$ to determine whether a contact occurs and a Y-axis coordinate of the contact. The second determiner 810 receives the digital sense data signals $DSN_X$ with respect to the X-axis coordinates from the register 750, and analyzes the digital sense data signals $DSN_X$ to determine whether a contact occurs and an X-axis coordinate of the contact.

The register 830 may be used to store information such as for example, a value of a contact state flag and contact information. The value of the contact state flag and the contact information vary based on the determined result of the first and second determiners 810 and 820.

The interface unit 840 may be, for example, a serial peripheral interface (SPI). The interface unit 840 outputs the contact information or control signals (not shown) to an external device, and receives data (not shown) or control signals from the external device.

The first and second processing circuits 710 and 720 will be described in detail with reference to FIG. 6. The first and second processing circuits 710 and 720, each of which is connected to the corresponding row or column sense data line $SY_1$-$SY_N$ and $SX_1$-$SX_M$, may be comprised of the same elements. For example, each of the first and second processing circuits 710 and 720 may include a plurality of switching elements SP1 and SP2, resistors R1 and R2, a converter 711 or 721, and a flip-flop 712 or 722.

The resistor R1 is connected between a high voltage VDH and a corresponding row/column sense data line $SY_1$-$SY_N$/$SX_1$-$SX_M$. The first switching element SP1 is connected between a low voltage VDL and a corresponding row/column sense data line $SY_1$-$SY_N$/$SX_1$-$SX_M$. The converter 711/721 is connected to a corresponding row/column sense data line $SY_1$-$SY_N$/$SX_1$-$SX_M$. The converter 711/721 compares a sense data signal from the row/column sense data line $SY_1$-$SY_N$/$SX_1$-$SX_M$ to a reference voltage Vcmp. The converter 711/721 includes a comparator COM that has an inversion terminal (−), a non-inversion terminal (+), and an output terminal. The inversion terminal (−) is connected to the corresponding row/column sense data line $SY_1$-$SY_N$/$SX_1$-$SX_M$, and the non-inversion terminal (+) is connected to the reference voltage Vcmp.

The second switching element SP2 is connected between the output terminal of the comparator COM and the flip-flop 712/722. The second switching element SP2 transmits an output signal from the comparator COM to the flip-flop 712/722.

The flip-flop 712/722 stores the output signal from the comparator COM through the second switching element SP2, and outputs the output signal as a digital sense data signal $DSN_Y$/$DSN_X$ in synchronization with a clock signal $CK_Y$/$CK_X$.

An input terminal of the flip-flop 712/722 is connected to the register R2 that is connected to a ground. The input terminal of the flip-flop 712/722 maintains a predetermined voltage level at register R2 when the second switching element SP2 is turned off. Alternatively, the input terminal of the flip-flop 712/722 may be connected to a capacitor.

Operations of the sensing units SU and the sense signal processor 700 will be described with reference to FIGS. 6 and 7. The first and second switching elements SP1 and SP2 of the first and second processing circuits 710 and 720 are turned off before sensing a contact, and the row and column sense data lines $SY_i$ and $SX_j$ are supplied with the high voltage VDH through the resistor R1.

When a sensing operation of a contact is started, the controller 760 changes a level of the initializing signal GC to a high level, i.e., a level sufficient to turn on the initializing transistor $Q_G$ for transmission to the initializing signal line GL. When the initializing transistor $Q_G$ is turned on, the output terminal and the control terminal of the sensing transistor $Q_{ji}$ become connected to each other. The sensing transistor $Q_{ji}$ is turned off to disconnect the row sense data line $SY_i$ and the column sense data line $SX_j$.

When the first control signal P1 is applied from the controller 760 to the first and second processing circuits 710 and 720, respectively, the second switching element SP2 of the first processing circuits 710 is turned on, and the first switching element SP1 of the second processing circuit 720 is turned on, causing the column sense data line $SX_j$ to be supplied with the low voltage VDL through the first switching element SP1.

The first processing circuit 710 reads a voltage of the row sense data line $SY_i$ as a sense data signal. When a touch occurs, the switching element $SW_{ji}$ is turned on such that the row sense data line $SY_i$ and column sense data line $SX_j$ are connected. The sense data signal of the row sense data line $SY_i$ is based on a voltage variation between the input terminal and the output terminal of the switching element $SW_{ji}$, i.e., between the column sense data line $SX_j$ and the row sense data line $SY_i$. However, when a touch does not occur, and thereby the switching element $SW_{ji}$ is turned off, the sense data signal of the row sense data line $SY_i$ is based on the low voltage VDL applied through the resistor R1.

The converter 711 compares the sense data signal from the row sense data line $SY_i$ to the reference voltage Vcmp, and converts a difference voltage between the sense data signal and the reference voltage Vcmp to a digital signal to generate an output signal. The reference voltage Vcmp may have a level between the high voltage VDH and the low voltage VDL, and the output signal from the comparator COM may have a digital value defined based on a polarity of the difference voltage. Alternatively, the reference voltage Vcmp may have a level lower than the low voltage VDL, and the output signal from the comparator COM may have a digital value that is digitally converted from a magnitude of a difference voltage.

The output signal from the comparator COM is stored in the flip-flop 712 through the turned-on second switching element SP2.

The operation of the first and second processing circuits 710/720 may be simultaneously performed. All the flip-flops 712 of all the first processing circuits 710 may simultaneously output the stored output signals to the register 750 as a digital sense data signal $DSN_Y$ in synchronization with the clock signal $CK_Y$ that may be simultaneously applied from the controller 760, and all the flip-flops 722 of all the first processing circuits 720 may simultaneously output the stored output signals to the register 750 as a digital sense data signal $DSN_X$ in synchronization with the clock signal $CK_X$ that may be simultaneously applied from the controller 760.

After the flip-flop 712 of the first processing circuit 710 outputs the output signal, the controller 760 terminates the output of the first control signal P1, and outputs the second control signal P2 to the first and second processing circuits 710 and 720.

The first switching element SP1 of the first processing circuit 710 and the second switching element SP2 of the second processing circuit 720 are turned on in response to the second control signal. However, the second switching element SP2 of the first processing circuit 710 and the first switching element SP1 of the second processing circuit 720 are turned off in response to the termination of the output of the first control signal P1.

A level of the row sense data line $SY_i$ is set to the low voltage VDL, and the second processing circuit 720 reads a voltage of the column sense data line $SY_j$ as a sense data signal. When a touch occurs, and thereby the switching element $SW_{ji}$ is turned on, the sense data signal of the column sense data line $SY_j$ is based on a voltage variation between the input terminal and the output terminal of the switching element $SW_{ji}$. However, when a touch does not occur, and thereby the switching element $SW_{ji}$ is turned off, the sense data signal of the column sense data line $SX_j$ is based on the low voltage VDL applied through the resistor R1.

The converter 721 compares the sense data signal from the column sense data line $SX_j$ to the reference voltage Vcmp, to generate a digital output signal, and the digital output signal from the comparator COM is stored in the flip-flop 722 through the second switching element SP2. The flip-flop 722 of the first processing circuit 720 outputs the stored digital output signal to the register 750 as a digital sense data signal $DSN_X$ in synchronization with the clock signal $CK_X$.

Since the control signals P1 and P2 and the clock signals $CK_X$ and $CK_Y$ may be simultaneously applied from the controller 760 to all of the first and second processing circuits 710 and 720, all of the first and second processing circuits 710 and 720 may simultaneously operate. All the first processing circuits 710 may simultaneously read the sense data signals from all of the row sense data lines $SY_1$-$SY_N$ in response to the control signal P1, and then all the second processing circuits 720 may simultaneously read the sense data signals from all of the column sense data lines $SX_1$-$SX_M$ in response to the control signal. Alternatively, the read order of the sense data signals from the row and column sense data lines $SY_1$-$SY_N$ and $SX_1$-$SX_M$ may be changed.

The digital sense data signals $DSN_Y$ with respect to all the row sense data lines $SY_1$-$SY_N$ and the digital sense data signals $DSN_X$ with respect to all the column sense data lines $SX_1$-$SX_M$ are stored in addresses of the register 750 corresponding to respective coordinates.

The contact determiner 800 receives digital sense data signals $DSN_Y$ and $DSN_X$ from the register 750 of the sense signal processor 700, and performs signal processing to determine whether a contact occurs and a position of the contact, and to output information of the determined result to an external device. The external device transmits image signals based on the information to the LCD.

The sense signal processor 700 may read the sense data signals in the porch period between two adjacent frames, and preferably in a front porch period before the vertical synchronization signal Vsync. The porch period may be used to decrease the influence of driving signals, such as, for example driving signals of the image scanning driver 400 and the image data driver 500, on the sense data signals such that reliability of the sense data signals is increased. However, the reading of the sense data signals by the sense signal processor 700 is not necessarily performed every frame, and may be performed once for a plurality of frames. Furthermore, the reading of the sense data signals may be performed twice or more in one porch period, or may be performed at least once in a period outside of the porch period.

While sensing units using a common electrode of the common electrode panel and a sense data line of the TFT array panel as two terminals where at least one is designed to protrude have been described, the present invention is not limited thereto. Other sensing units may be employed in the present invention. For example, a sensing unit using a variable capacitor and a reference capacitor, or a photo sensor outputting an output signal of which a level is changed based on the intensity of light, may be employed. In addition, the present invention may be applied to a display device including two or more kinds of sensing units.

While exemplary embodiments of the present invention have been described with an LCD, the present invention is not limited thereto. For example, a plasma display device, an organic light emitting device (OLED), or other flat panel displays may be employed in the present invention.

In at least one embodiment of the present invention, sense data signals with respect to X-axis and Y-axis coordinates at which a contact occurs are generated using one sensing unit, and thereby a sense data signal with respect to each coordinate may be regularly obtained.

Having described exemplary embodiments of the present invention, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a display panel having a first panel and a second panel that face each other with a liquid crystal layer disposed between the first panel and the second panel;
    a plurality of first sense data lines extending in a row direction on the second panel;
    a plurality of second sense data lines extending in a column direction on the second panel;
    a plurality of sensing units positioned in regions defined by the first and second sense data lines, wherein a first sense data line is connected to a second sense data line by a contact to output a first sense data signal through the first sense data line and a second sense data signal through the second sense data line; and
    a sense signal processor reading and processing the first and second sense data signals,
    wherein at least one of the sensing units comprises:
        a first transistor having a control terminal, a first non-control terminal connected to each of the first sense data lines, and a second non-control terminal connected to each of the second sense data lines; and
        a second transistor having a control terminal receiving an initializing signal to turn off the first transistor, a first non-control terminal connected to each of the first sense data lines, and a second non-control terminal connected to the control terminal of the first transistor, and
    wherein the contact is application of physical pressure to the corresponding sensing unit.

2. The display device of claim 1, wherein the display panel further comprises a common electrode supplied with a common voltage and formed on the first panel.

3. The display device of claim 2, wherein the display panel further comprises a protrusion facing the control terminal of the first transistor, wherein the protrusion is disposed between the first panel and the common electrode.

4. The display device of claim 3, wherein the sense signal processor comprises:
    a plurality of first processing circuits connected to the first sense data lines, wherein the first processing circuits generate a first processed signal based on the first sense data signal;
    a plurality of second processing circuits connected to the second sense data lines, wherein the second processing circuits generate a second processed signal based on the second sense data signal; and
    a storing unit storing the first and second processed signals.

5. The display device of claim 4, wherein each of the first processing circuits comprises:
    a first resistor connected between a first voltage and the first sense data line;
    a first switching element connected between a second voltage and the first sense data line;
    a first comparator comparing the first sense data signal from the first sense data line and a reference voltage to generate the first processed signal;
    a first flip-flop storing the first processed signal; and
    a second switching element connected between the first comparator and the first flip-flop, and
    wherein each of the second processing circuits comprises:
        a second resistor connected between the first voltage and the second sense data line;
        a third switching element connected between the second voltage and the second sense data line;
        a second comparator comparing the second sense data signal from the second sense data line and the reference voltage to generate the second processed signal;
        a second flip-flop storing the second processed signal; and
        a fourth switching element connected between the second comparator and the second flip-flop.

6. The display device of claim 5, wherein the first and fourth switching elements are simultaneously turned on, and the second and third switching elements are simultaneously turned on.

7. The display device of claim 5, wherein the first flip-flop is in synchronization with a first clock signal and simultaneously outputs the first processed signal to the storing unit, and the second flip-flop is in synchronization with a second clock signal and simultaneously outputs the second processed signal to the storing unit.

8. The display device of claim 4, wherein the sense signal processor further comprises a controller that outputs a control signal to control the first and second processing circuits and the initializing signal.

9. The display device of claim 4, further comprising a contact determiner that receives the first and second processed signals and determines a contact position.

10. The display device of claim 9, wherein the contact determiner comprises:
    a first determiner that receives the first processed signal to determine an X-axis coordinate of a contact;
    a second determiner that receives the second processed signal to determine a Y-axis coordinate of the contact; and
    a register that stores the X-axis and Y-axis coordinate of the contact in a flag.

11. The display device of claim 10, wherein the contact determiner further comprises an interface that outputs values stored in the flag.

12. A method of driving a display device having a plurality of first sense data lines extending in a row direction, a plurality of second sense data lines extending in a column direction, a plurality of sensing units connected to the first and second sense data lines and sensing a contact, the method comprising:
    connecting at least one of the first sense data lines and at least one of the second sense data lines through at least one of the sensing units when a contact occurs;

applying a first voltage to the second sense data lines;
reading voltage variations of the first sense data lines as first sense data signals and generating first processed signals based on the first sense data lines;
applying the first voltage to the first sense data lines;
reading voltage variations of the second sense data lines as second sense data signals and generating second processed signals based on the second sense data lines; and
determining contact information based on the first and second processed signals.

13. The method of claim 12, wherein the generation of the first and second processed signals comprises comparing voltages of the first and second sense data lines and a reference voltage to generate the first and second processed signals.

14. The method of claim 13, further comprising:
substantially simultaneously writing the first processed signals in a register after generating the first processed signals; and
substantially simultaneously writing the second processed signals in the register after generating the second processed signals.

15. The method of claim 14, wherein the determination of the contact information comprises:
outputting the first and second processed signals written in the register;
determining an X-axis coordinate of the contact based on the first processed signals;
determining a Y-axis coordinate of the contact based on the second processed signals; and
storing an indication that the contact has occurred and the X-axis and Y-axis coordinates of the contact.

16. The driving method of claim 15, wherein each of the sensing units comprises a transistor having a control terminal, a first terminal connected to each of the first sense data lines, and a second terminal connected to each of the second sense data lines, and the control terminal is connected to a common electrode by a contact.

17. The driving method of claim 16, wherein the display device comprises a liquid crystal layer, a lower substrate having the sensing units, and an upper substrate having the common electrode.

18. The driving method of claim 17, wherein the upper substrate comprises a protrusion facing the control terminal of the transistor, wherein the protrusion is formed under the common electrode.

19. The driving method of claim 18, further comprising turning off the transistor before applying the first voltage to the second sense data lines.

20. A display device comprising:
a display panel having a first substrate and a second substrate that face each other with a liquid crystal layer disposed between the first substrate and the second substrate;
a plurality of first sense data lines extending in a row direction on the second substrate;
a plurality of second sense data lines extending in a column direction on the second substrate;
a plurality of sensing units positioned in regions defined by the first and second sense data lines, wherein a first sense data line is connected to a second sense data lines by a contact to output a first sense data signal through the first sense data line and a second sense data signal through the second sense data line; and
a sense signal processor reading and processing the first and second sense data signals,
wherein a common electrode receiving a common voltage is located on top of the first substrate and has a protrusion,
wherein at least one of the sensing units comprises a transistor,
wherein the transistor has a control terminal, a first non-control terminal connected to each of the first sense data lines, a second non-control terminal connected to each of the second sense data lines, and
wherein the control terminal is located on top of the second substrate, a contact member is located on top of the control terminal, a part of the contact member overlaps with the protrusion, and the part of the contact member contacts the protrusion when a physical touch applied to the first substrate over the protrusion applies sufficient pressure to bring the contact member into contact with the protrusion.

21. The display device of claim 20, wherein the corresponding sensing unit comprises a switching element connected between the first non-control terminal and the control terminal of the transistor, wherein the switching element turns off the transistor based on an initializing signal.

* * * * *